(No Model.)

J. L. POWLES.
DRAFT EQUALIZER.

No. 353,082. Patented Nov. 23, 1886.

WITNESSES:

INVENTOR:
J. L. Powles
BY Munn & Co.
ATTORNEYS.

UNITED STATES PATENT OFFICE.

JOHN L. POWLES, OF GOODLAND, INDIANA.

DRAFT-EQUALIZER.

SPECIFICATION forming part of Letters Patent No. 353,082, dated November 23, 1886.

Application filed August 31, 1886. Serial No. 212,301. (No model.)

*To all whom it may concern:*

Be it known that I, JOHN L. POWLES, of Goodland, in the county of Newton and State of Indiana, have invented a new and Improved Draft-Equalizer, of which the following is a full, clear, and exact description.

My invention relates to draft-equalizers, especially for four horses, and has for its object to provide substantial and effective devices of this character in which side draft will practically be obviated, and the draft apportioned to the animals as their strength and the work to be done may require.

The invention consists in certain novel features of construction and combinations of parts of the draft-equalizer, all as hereinafter fully described and claimed.

Reference is to be had to the accompanying drawings, forming a part of this specification, in which similar letters of reference indicate corresponding parts in both the figures.

Figure 1:
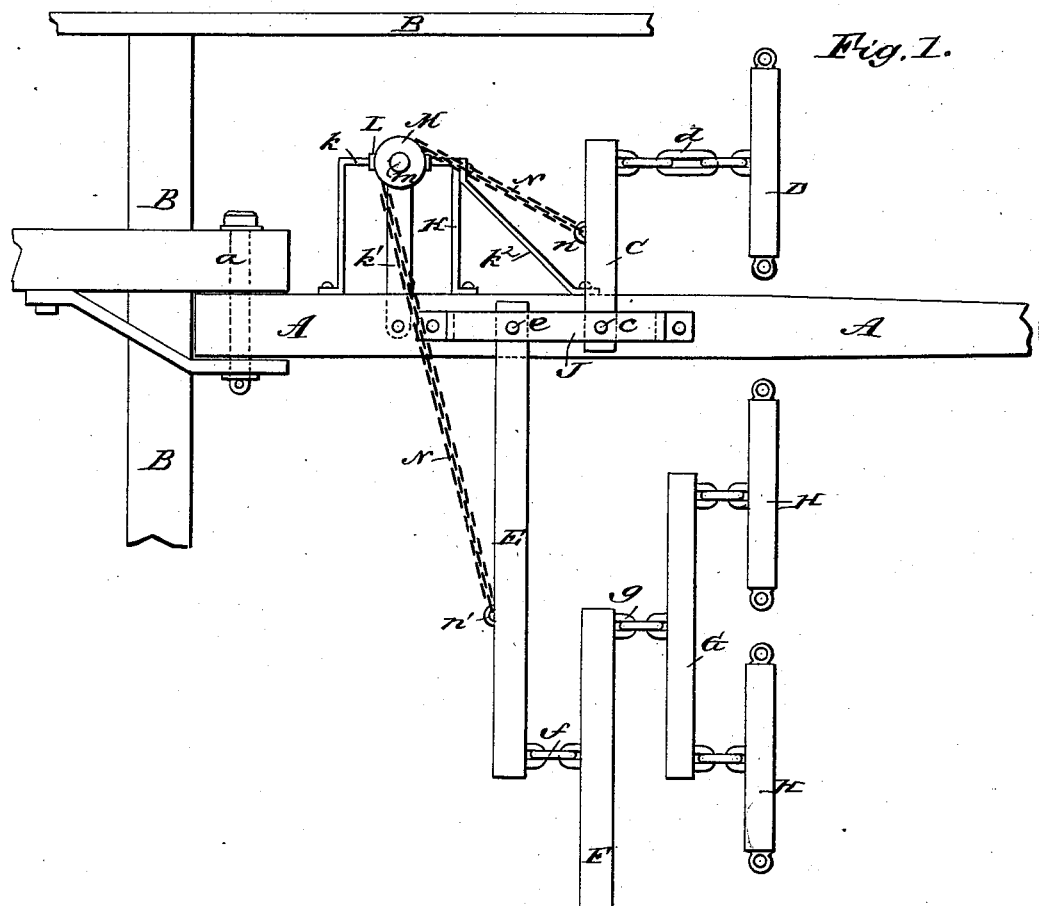
Figure 2:
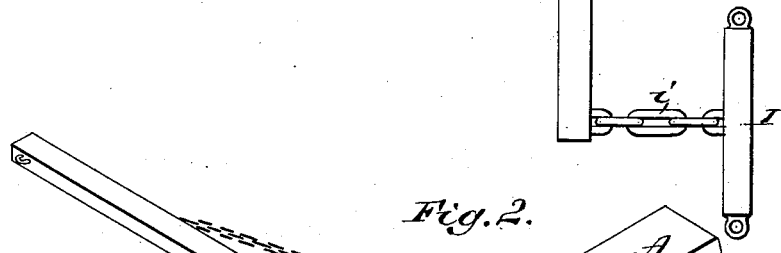

Figure 1 is a plan view of my draft-equalizer for four horses, with the pole or tongue partly broken away, and shows also a part of the frame of a machine to which the equalizer is connected; and Fig. 2 is a detail perspective view of the back end of the pole and the connected draft-levers and their chain and roller connections.

The tongue or pole A of the draft-equalizer is to be pivoted at $a$ to the frame B of an agricultural implement or vehicle to be drawn. A short lever, C, is fulcrumed at $c$ at its inner end to the pole A, and a single-tree, D, is coupled by a chain, $d$, to the outer end of the lever. A longer lever, E, is fulcrumed at $e$ to the pole A, and projects therefrom in the opposite direction to that of the lever C, and to the outer end of this lever E there is coupled at $f$ a lever, F, to the inner short arm of which is coupled at $g$ a double-tree, G, to the opposite ends of which single-trees H H are coupled, and to the long arms of the lever F there is coupled by a chain, $i$, a single-tree, I. The draft of three horses is thus equalized on the outer end of the lever F. A long hammer-strap, J, is secured at the ends to the pole A, and extends over the inner ends of the levers C E, and gives substantial bearings to the pivots $c\ e$ of these levers.

To the side of the pole A next the lever C there is fixed a three-sided metal frame, K, which is stayed to the pole by a laterally-ranging center brace, $k'$, and a forwardly-inclined or diagonal brace, $k^2$. On the outer cross-bar, $k$, of the frame K there is fitted to slide in direction of the length of the pole A a metal yoke, L, to which is pivoted on a pin, $m$, a roller or pulley, M, and over or around this roller passes a chain, N, one end of which is connected at $n$ to the lever C, and the other end of which is connected at $n'$ to the lever E. The distance from the connection at $n$ to the pivot $c$ of the lever C is one-third the distance from the connection at $n'$ to the pivot $e$ of the lever E; or, in other words, the proportionate leverage of the levers C E to each other is as one is to three; hence the draft of all four horses will be equalized.

The yoke L may be shifted backward and forward along the bar $k$ of the frame K, and be held by a pin, $l$, passed through the yoke and any one of a series of holes, $l'$, in the frame. (See Fig. 2 of the drawings.) This adjustment of the yoke and roller L M on the bar $k$ makes allowance for attaching the chain-links at $n\ n'$ to the levers and drawing the chain up taut around the roller while the levers stand at right angles to the pole.

The opposite levers, C E, pivoted to the tongue, may be connected by a chain or rope in a manner to adjust the leverage to accommodate two, three, four, or more horses, and by passage of this chain or rope over the roller L the operation of the equalizer will always be easy and effective.

Having thus fully described my invention, I claim as new and desire to secure by Letters Patent—

In a draft-equalizer, the combination, with a pole, A, of levers C E, adapted to receive draft attachments, a frame, K, fixed to the pole, a yoke, L, fitted adjustably on the frame K, a roller, M, journaled to said yoke, and a chain or rope, N, passed over the roller and connected at opposite ends to the levers C E, to give proportionate leverage, substantially as described, for the purposes set forth.

JOHN L. POWLES.

Witnesses:
ALVIN J. KITT,
ABRAHAM T. McCURRY.